(12) United States Patent
Oh et al.

(10) Patent No.: US 6,756,940 B2
(45) Date of Patent: Jun. 29, 2004

(54) REMOTE TERMINAL LOCATION ALGORITHM

(75) Inventors: Joungheon Oh, Los Angeles, CA (US); Wei-Chung Peng, Rancho Palos Verdes, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/023,216

(22) Filed: Dec. 18, 2001

(65) Prior Publication Data

US 2003/0128161 A1 Jul. 10, 2003

(51) Int. Cl.$^7$ .................................................. G01S 1/24

(52) U.S. Cl. ...................... 342/387; 342/457; 701/207

(58) Field of Search ................................. 342/387, 442, 342/457; 701/207, 300; 455/456, 457

(56) References Cited

U.S. PATENT DOCUMENTS

| | | | |
|---|---|---|---|
| 5,884,221 A | 3/1999 | Wortham | |
| 5,926,133 A | 7/1999 | Green, Jr. | |
| 6,035,202 A | 3/2000 | Camp, Jr. | |
| 6,266,534 B1 | 7/2001 | Raith et al. | |
| 6,282,427 B1 | 8/2001 | Larsson et al. | |
| 6,408,246 B1 * | 6/2002 | Fox ............................. | 701/300 |

* cited by examiner

*Primary Examiner*—Dao Phan
(74) *Attorney, Agent, or Firm*—Blakely, Sokoloff, Taylor & Zafman (57) ABSTRACT

Various approaches for forming more accurate location estimates are disclosed. In some approaches, a plurality of preliminary location estimates are formed based on subsets of time-of-arrival measurements. A final location estimate is then made based on the preliminary location estimates. In other approaches, a quality indicator associated with the time-of-arrival measurements is modified, and subsequently used in a location algorithm. Optionally, multiple approaches may be used together.

30 Claims, 8 Drawing Sheets

REMOTE TERMINAL LOCATION ALGORITHM

FIELD OF THE INVENTION

The field of the present invention relates to location services. More particularly, the field of the present invention relates to locating a mobile device by noting times of arrival of signals that travel between the mobile device and a plurality of transmitters or receivers located at known positions, and computing a location based on the noted times of arrival.

BACKGROUND OF THE INVENTION

Recently, the FCC mandated the introduction of location services that can accurately locate wireless subscribers on all wireless networks. Two previously proposed approaches for implementing such location services are the "uplink" approach and the "downlink" approach.

In the uplink approach, the mobile device (also referred to as a "handset" or "remote terminal") that is to be located sends out a signal such as a random access channel (RACH) burst. The time of arrival (TOA) of the signal is determined at each of a plurality of location measurement units (LMUs), together with an associated quality indicator ($\sigma$). Each of these noted TOAs and $\sigma$s is then sent to a computer. The computer then uses conventional algorithms, which are well known to those skilled in the art, to determine the location of the mobile device based on the TOA and $\sigma$ determinations made by the LMUs and the known location of the LMUs.

One suitable conventional location algorithm uses a Taylor search to locate the intersection of two or more hyperbolas. Details of a such an algorithm can be found in "Statistical Theory of Passive Location Systems" by D. J. Torrieri, IEEE Transactions on Aerospace and Electronic Systems, Vol. AES-20, No. 2, March 1984. This algorithm locates the mobile device based on three or more TOA readings (which are used to determine the distance from the mobile device to the LMU based on the speed c of the signal), the associated $\sigma$s, and the known locations of each LMU.

In the downlink approach, each of a plurality of base stations (BTSs) sends a signal to the mobile device to be located, and the mobile device determines the TOA and $\sigma$ of each of these signals. These TOAs and $\sigma$s are then transmitted to a remote computer, which implements a conventional algorithm to determine the mobile device's location based on the TOAs and $\sigma$, similar to the uplink type systems. Alternatively, if sufficient processing power is available in the handset, the algorithm may be implemented in the handset. When the transmission frames of the BTSs are not synchronized, the downlink algorithms are somewhat more complex because the computer must obtain the relative time difference between each BTS transmission to calculate a location. This relative time information can be obtained using auxiliary receivers located at known locations to measure the TOAs of the signals from the BTSs, in a conventional manner.

In both uplink and downlink systems, three TOA measurements are sufficient to form a location estimate. The accuracy of the location estimate, however, is limited by the resolution of the TOA measurements. In addition, when noise and interference corrupt the TOA measurements used as inputs to the location algorithm, the accuracy of the location estimate is further reduced. Using more than three TOAs (e.g., using 4–7 TOAs) to form the location estimate can provide improved accuracy, as compared to estimates based on only three TOAs. Unfortunately, in order to include additional TOA measurements, it is often necessary to rely on TOA readings with poor quality communication links. The poor quality of these communication links can counteract some or all of the benefits provided by the additional TOA measurements. In certain circumstances, a location estimate based on four or more TOA measurements may be even worse than an estimate based on only three TOA measurements.

Multipath interference can be particularly problematic because the path traveled by a multipath signal includes reflections (e.g., when the signal reflects off of buildings, mountains, etc.). These reflections increase the length of the path traveled by the signal, with a resulting increase in the TOA, so that the TOA no longer matches the straight-line distance between the signal source and destination. The inaccurate TOA then distorts the location estimate produced by the location algorithm. This problem is compounded by the fact that multipath signals can be relatively strong, and may therefore be selected to form a location estimate in place of weaker signals that may actually be more accurate.

DETAILED DESCRIPTION OF THE PREFERRED EMBODIMENTS

Figure 1A:
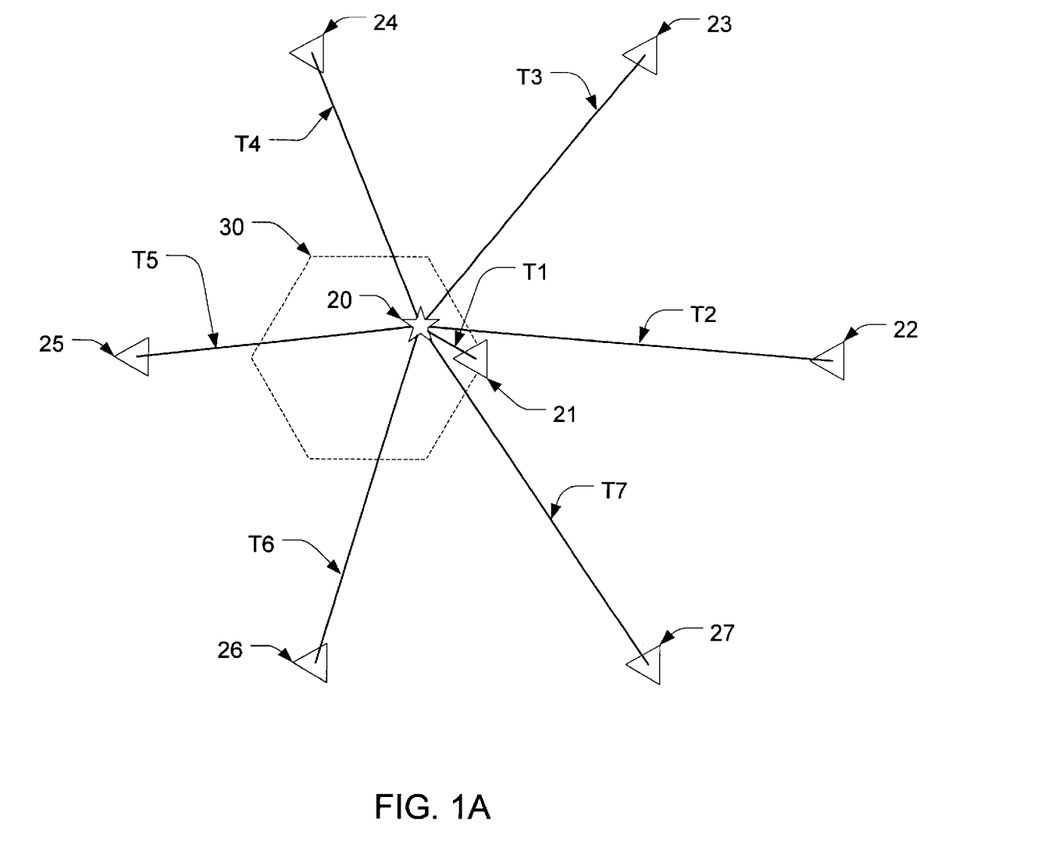
FIG. 1A is a schematic illustration of a mobile device to be located, a plurality of LMUs in an uplink system, and the signal paths therebetween.

FIG. 1A illustrates a system with a mobile device 20 that is to be located based on the mobile device's communications with a plurality of fixed stations. These fixed stations are preferably permanently fixed to the earth at known reference locations, but may also be temporarily fixed in position (e.g., on a truck at a known reference location). In a preferred embodiment, the mobile device 20 is a cellular telephone that is located within a particular cell 30.

In uplink systems, the fixed stations are preferably LMUs 21–27 that are located in the general vicinity of the mobile device 20. It takes the signal a certain time to travel from the mobile device 20 to each of the LMUs 21–27, based on the distance and the speed of light. The times of travel T1–T7 are labeled for each respective signal path to a LMU 21–27. When the signals arrives at their destination, a time of arrival (TOA) and a quality indicator σ is determined by the LMU 21–27 for each signal. The conventional quality indicator σ provides an estimate of the standard deviation of the TOA measurement.

Because all the signals in FIG. 1A travel from their source to their destination in straight lines, each of the times T1–T7 is directly proportional to the straight-line distance between the mobile device 20 and the respective LMU 21–27. Under these conditions, a conventional location-estimation algorithm would produce a relatively accurate location estimate for the mobile device 20 based on the TOAs determined at each of the LMUs 21–27.

Figure 1B:
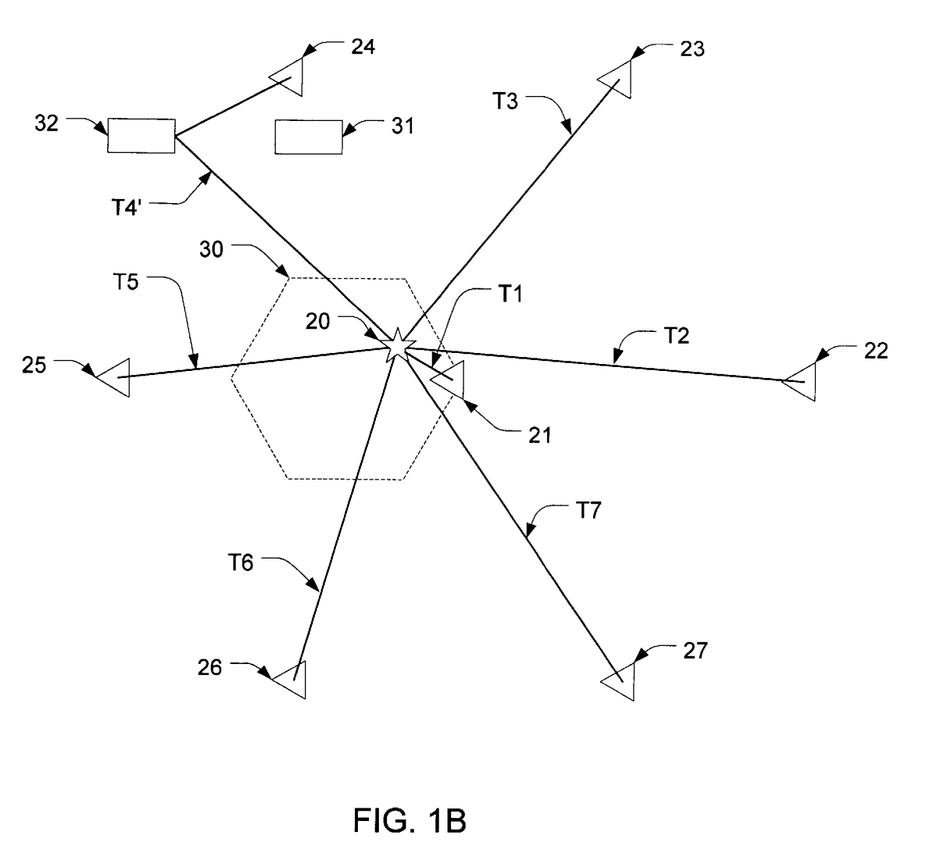
FIG. 1B is a schematic illustration of a mobile device to be located, a plurality of LMUs in an uplink system, and the signal paths therebetween, with multipath in one of the signal paths.

FIG. 1B illustrates an example of a situation where the times T1–T7 are not all directly proportional to the distance between the mobile device 20 and the respective LMU 21–27. In the FIG. 1B example, a first building 31 blocks the straight-line path between the mobile device 20 and the fourth LMU 24. A second building 32 is positioned so that a signal can travel between the fourth LMU 24 and a mobile device 20 by bouncing off of the second building 32. T4' is the amount of time it takes for the signal to travel between the fourth LMU 24 and the mobile device 20. This T4' corresponds to the sum of the two path segments between the fourth LMU 24 and the mobile device 20, and not to the straight-line distance between the fourth LMU 24 and the mobile devices 20. As a result, the TOA of the signal is delayed with respect to the hypothetical TOA of the signal along a straight-line path. This situation is referred to as multipath, and the TOA measurements that do not represent a straight-line distance are referred to as outliers.

Figure 2:
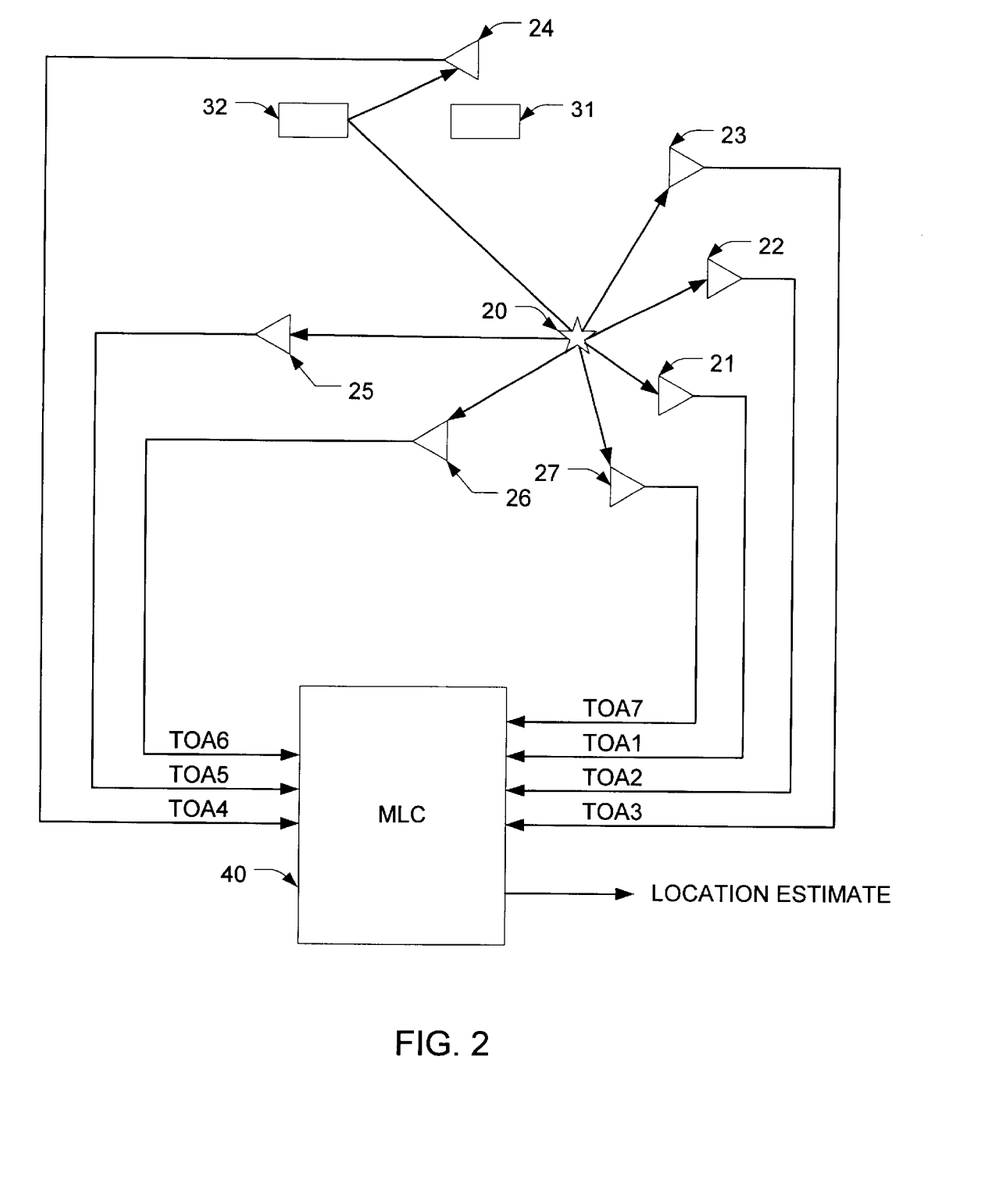
FIG. 2 is a schematic illustration of a hardware configuration for an uplink system, which provides a first context for implementing a preferred location algorithm.

FIG. 2 is an example of a suitable uplink hardware configuration which can be used to implement the algorithms described below. In this uplink system, a mobile device 20 sends out a signal (e.g., a RACH burst) that is received by a plurality of LMUs 21–27, as described above. While seven LMUs are illustrated, any number greater than four may be used. When the mobile device 20 sends out a signal, each of the LMUs 21–27 determines the TOA and σ of the signal, and forwards the TOA and σ measurements to a mobile location center (MLC) 40. The TOA measurements TOA1–TOA7 and the associated σ measurements may be transmitted from the LMUs 21–27 to the MLC 40 in any conventional manner, including, for example, hard-wired and wireless links. The MLC 40 is preferably a computer that is programmed to implement the location algorithms described below to determine the location of the mobile device 20.

Unfortunately, when the signal is an outlier, the conventional quality indicator σ is not highly correlated to the accuracy of the corresponding TOA measurement. As a result, a TOA measurement may be highly inaccurate, yet still have very low σ(which erroneously indicates that the quality of the TOA measurement is good). And when an inaccurate TOA with a low σ is fed into the conventional location-determining algorithm, the resulting location estimate can have a large error.

A first preferred approach to achieve improved accuracy is by using an improved quality indicator σ in place of the conventional quality indicator σ. This improved σ' is formulated so that it will have a higher correlation with the actual standard deviation of the TOA measurement (as compared to the conventional σ). One preferred way to generate this improved σ' is to modify the conventional TOA quality indicator σ based on the signal-to-noise ratio (SNR) estimate and the mean number of selected bursts (nsb) that are computed along with the TOA measurements in conventional TOA estimation algorithms. (For example, nsb is computed in the conventional Incoherent Integration and Multi-Path Rejection (ICI-MPR) algorithm which selects a number of random subsets of channel power profiles of the received bursts).

One suitable algorithm for generating the improved σ' is based on the fact that the SNR estimate is generally reliable when the SNR is sufficiently high, but is generally less reliable when the SNR is low, particularly when the associated nsb is larger than a predetermined threshold. This algorithm may be implemented in a two step process:

In the first step, we generate an intermediate result X by multiplying the conventional σ by a multiplier selected from the following table, depending on the SNR:

| | |
|---|---|
| SNR ≥ 15 dB | X = 0.8σ |
| 15 dB > SNR ≥ 10 dB | X = 0.9σ |
| 10 dB > SNR ≥ 5 dB | X = 1.0σ |
| 5 dB > SNR ≥ 0 dB | X = 1.2σ |
| 0 dB > SNR ≥ −5 dB | X = 1.4σ |
| −5 dB > SNR | X = 1.5σ |

In the second step, we check to determine if SNR<−5 dB and nsb>40. If both of these conditions are met, we set σ'=2X+1. Otherwise, we set σ'=X.

The two steps described above for generating σ can be generalized as follows:

Step 1: X=a*σ, where a is a function of SNR; and
Step 2: σ'=b*X+c, if SNR<TH, and nsb>N;
σ'=X otherwise.

The specific parameters a, b, and c (and the dependency of a on SNR) used in above example were determined experimentally by trial and error. The resulting quality indicator σ' has a higher correlation with the actual error of the TOA reading than the conventional quality indicator σ. When this improved quality indicator is used as an input to a conventional location-estimation algorithm, the resulting location estimates have improved accuracy.

It has been found experimentally that in a "bad urban" environment, when six or seven TOA measurements are used to form a location estimate, the improved quality indicator σ' works better that other quality indicators considered by the inventors.

A second preferred approach to achieve improved accuracy is by using smart subsetting to select which of the available TOA measurements should be used as the basis for forming the location estimate.

Figure 3:
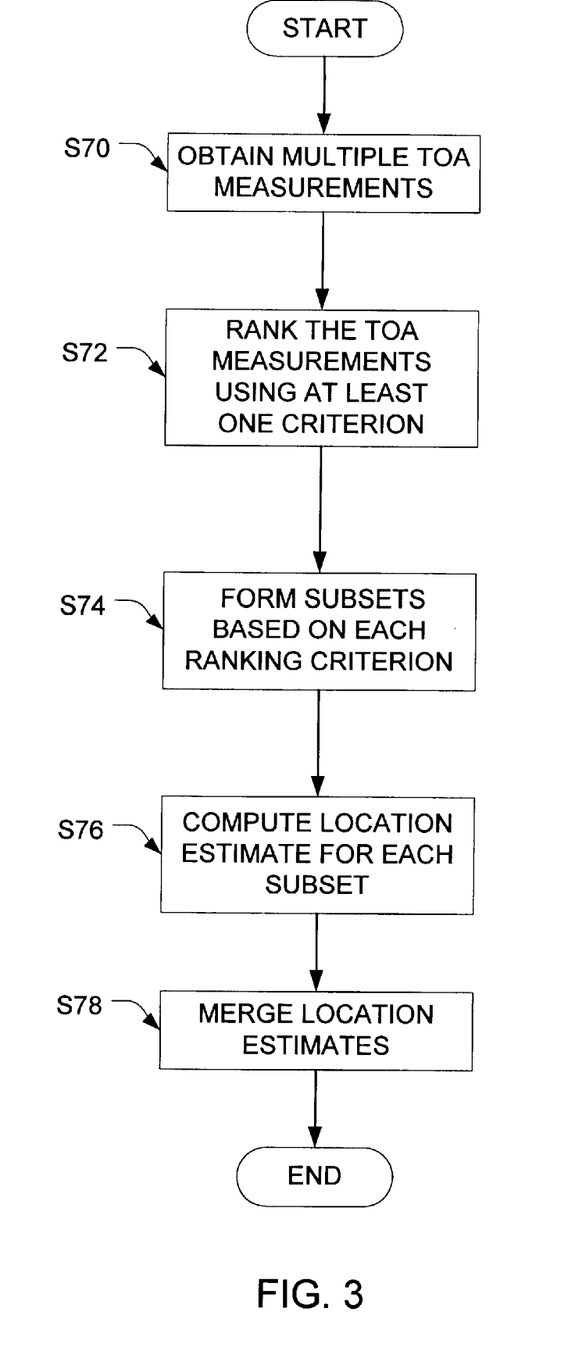
FIG. 3 is a flowchart of a method for creating a location estimate from a plurality of TOA measurements.

FIG. 3 is a flowchart of one preferred approach to eliminating the negative effects of incorrect TOA measurements (like the outlier T4' measured by the LMU 24 shown in FIG. 1B). First, in step S70, a plurality of TOA and σ measurements are obtained by the LMUs. These TOA and σ measurements may be obtained using any of a variety of techniques well known to those skilled in the art.

In step S72, the TOA measurements are ranked according to at least one criterion. Preferably, the TOA measurements are ranked according to two or more criteria. Examples of suitable criteria for ranking the TOA measurements include: the original quality indicator σ, the improved quality indicator σ, or the estimated worse-case path loss for the path between the mobile device 20 and the respective LMU 21–27. Other criteria that may be used to rank the TOA measurements include the signal to noise ratio (SNR) or carrier to interference ratio (CIR) of each link between the mobile device 20 and the respective LMU 21–27.

An example of ranking for each TOA measurement is shown in the Table 1A, where an "A" in the right-hand column corresponds to the best-ranked TOA measurement, and a "G" corresponds to the worst-ranked TOA measurement.

TABLE 1A

| TOA No. | Ranking 1 |
|---|---|
| TOA1 | B |
| TOA2 | D |
| TOA3 | A |
| TOA4 | G |
| TOA5 | C |
| TOA6 | F |
| TOA7 | E |

Preferably, the TOA measurements are ranked according to two or more criteria, so additional sets of rankings are required. An example of a second ranking for each TOA measurement is shown in the Table 1B, where an "a" in the right-hand column corresponds to the best-ranked TOA measurement, and a "g" corresponds to the worst-ranked TOA measurement.

TABLE 1B

| TOA No. | Ranking 2 |
|---|---|
| TOA1 | a |
| TOA2 | c |
| TOA3 | b |
| TOA4 | f |
| TOA5 | g |
| TOA6 | e |
| TOA7 | d |

Next, in step S74, subsets of the TOA measurements are formed based on the ranking results. Table 2A illustrates an example of how TOA subsets are formed based on the first ranking results (from Table 1A). The desired TOA components for each of the six location estimates E1–E6 are shown in the middle column of Table 1B. Each of these six estimates E1–E6 includes the four best TOA measurements A, B, C, and D (i.e., a high-quality set of TOAs). In addition, subsets of the remaining set of low-quality TOAs are used in each of the estimates. In the illustrated example, estimates E1–E3 each include an additional TOA, taken one at a time from the set of low quality TOAs (i.e., either E, F, or G). Estimates E4–E6 each include additional TOA measurements, taken two at a time from the set of low quality TOAs (i.e., either EF, EG, or FG). Optionally, an additional location estimate may be formed using the four best TOAs plus all three low-quality TOAs (ABCDEFG, not shown), and another additional location estimate may be formed using the four best TOAs (ABCD, not shown) and the null set of the low quality TOAs (i.e., none of the low quality TOAs).

TABLE 2A

| Location Estimate No. | Desired Components | TOAs Used to Form Location Estimate $E_I$ |
|---|---|---|
| E1 | ABCDE | 3,1,5,2,7 |
| E2 | ABCDF | 3,1,5,2,6 |
| E3 | ABCDG | 3,1,5,2,4 |
| E4 | ABCDEF | 3,1,5,2,7,6 |
| E5 | ABCDEG | 3,1,5,2,7,4 |
| E6 | ABCDFG | 3,1,5,2,6,4 |

Next, the components listed in the middle column of Table 1B are used as an index into Table 1A to determine which subset of the TOAs will be used to form each location estimate, as indicated in the right column of Table 1B.

Preferably, more than one ranking criterion is used, and a similar process is implemented for each of the additional ranking criteria. For example, the ranking results from table 1B would result in the selection of the sets of TOAs shown in Table 2B.

TABLE 2B

| Location Estimate No. | Desired Components | TOAs Used to Form Location Estimate $E_I$ |
|---|---|---|
| E7 | abcde | 1,3,2,7,6 |
| E8 | abcdf | 1,3,2,7,4 |
| E9 | abcdg | 1,3,2,7,5 |
| E10 | abcdef | 1,3,2,7,6,4 |
| E11 | abcdeg | 1,3,2,7,6,5 |
| E12 | abcdfg | 1,3,2,7,4,5 |

Optionally, an additional location estimate for the second ranking criteria may be formed using all seven TOAs (abcdefg, not shown), and another additional location estimate may be formed using only the four best TOAs (abcd, not shown).

In alternative embodiments, instead of starting with seven TOA measurements, a different number of TOA measurements may be used (e.g., 5, 6, 8, etc.). And instead of distributing those TOA measurements into a high-quality set of four measurements and a low-quality set of three measurements, those sets may contain a different number of members (e.g., seven TOA measurements may be distributed into a high-quality set of three measurements and a low-quality set of four measurements). Appropriate changes to the tables 1A, 1B, 2A, and 2A would, of course, be required, as will be appreciated by those skilled in the art.

In another alternative embodiment, instead of ranking the TOA measurements using two different quality criteria, a single quality criterion may be used. In this case, only one set of tables would be needed (i.e., Tables 1A and 2A). In other alternative embodiments, three or more different quality criteria may be used, and corresponding additional sets of table would be needed.

Next, in step S76, a location estimate $E_I$ is computed for each of the subsets of TOAs formed in step S74, resulting in a plurality of location estimates (12 estimates E1–E12 in the illustrated embodiment, or some other number of estimates in the alternative embodiments). Each location estimate is formed based on its constituent TOA components using any suitable location estimation algorithm.

Figure 4:
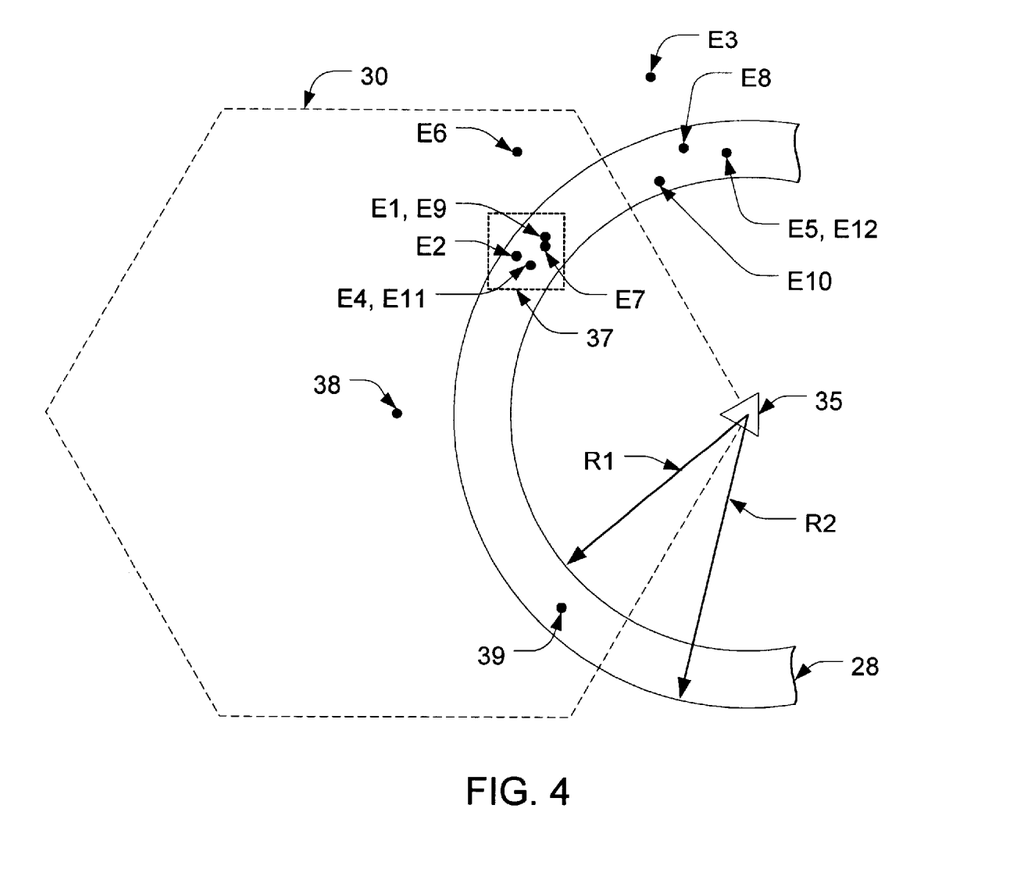
FIG. 4 is a schematic illustration of a plurality of preliminary location estimates in and around a cell, where each preliminary location estimate is obtained by combining a number of TOAs.

FIG. 4 is a schematic illustration of a set of location estimates E1–E12 obtained for each of the twelve subsets of TOAs (generated using Tables 1A, 1B, 2A, and 2B). In this example, it is assumed that the TOA4 measurement is an outlier caused by multipath. Note that multiple location estimates can map onto the same location when those estimates are based on the same subset of TOAs. For example, location estimate E1, which includes the five best-ranking TOAs according to the first quality indicator, is formed using TOA3, TOA1, TOA5, TOA2, and TOA7. Similarly, location estimate E9, which includes the TOAs ranked 1–4 and 6 according to the second quality indicator, is formed using the same set of TOAs. Accordingly, estimates E1 and E9 will be identical (unless variations in their quality ranking effect the location estimate). Similarly, location estimates E4 and E11 are formed using an identical subset of TOAs, as are location estimates E5 and E12.

Figure 5:
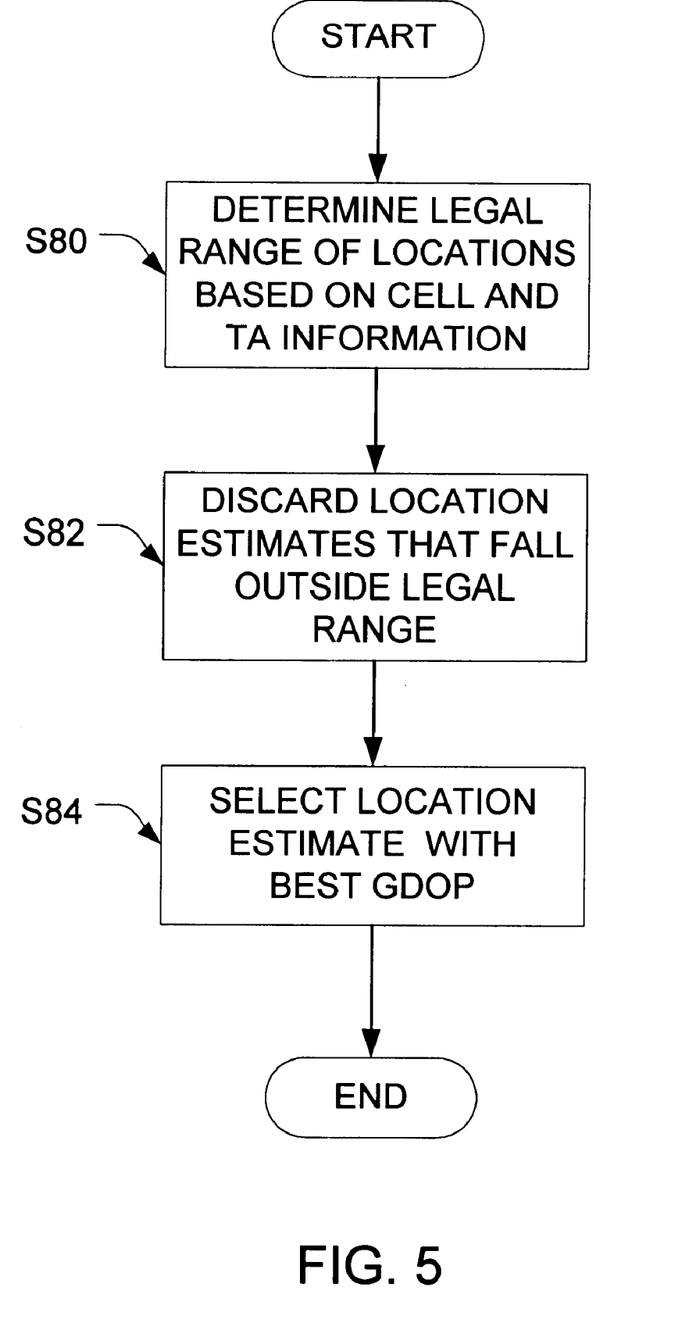
FIG. 5 is a flowchart of a method for merging a plurality of location estimates into a final location estimate.

Returning now to FIG. 3, after location estimates have been computed for each of the subsets, processing continues at step S78 where these location estimates are merged into a final location estimate. FIG. 5 is a flowchart illustrating an example of how a plurality of preliminary location estimates can be merged using a number of different techniques. It is best understood when viewed together with FIG. 4.

A third approach to improving the accuracy of the location estimation algorithm is implemented in steps S80 and S82 of FIG. 5. First, in step S80, a legal range of locations is determined based on which cell is currently serving the mobile device 20 and the timing advance (TA). The cell information is obtained by determining which base station is currently communicating with the mobile device. The location of the mobile device can then be narrowed down to somewhere within the region 30 served by that particular base station 35. That mobile device's location can be narrowed down further based on the TA, because it takes a finite amount of time for a transmission to travel between the antenna 35 and the mobile device. Although the TA cannot be used to determine an exact distance between the antenna 35 and the mobile device, it can be used to obtain a rough estimate of that distance, bounded by an inner radius R1 and an outer radius R2. These radii R1, R2 define a region 28 centered about the antenna 35. The boundaries of this region 28 depend on the particular antenna 35 used to communicate with the mobile device being located, and the TA information and resolution.

In step S82, each of the preliminary location estimates are checked against the boundary of the cell 30 and the boundary of the region 28, and all location estimates that fall outside of either of these boundaries are discarded. In the illustrated example, location estimates E3, E5, E8, E10, and E12 are discarded because they lie outside of the cell boundary 30. Preliminary location estimate E6 is also discarded because, although it is within the cell boundary 30, it lies outside of the legal-range region 28 (due to an inconsistent TA). Optionally, whenever a location estimate is discarded because it lies outside of the boundaries of the cell 30, that estimate may be replaced by a substitute estimate 38, located at the center of the cell 30.

Figure 6A:
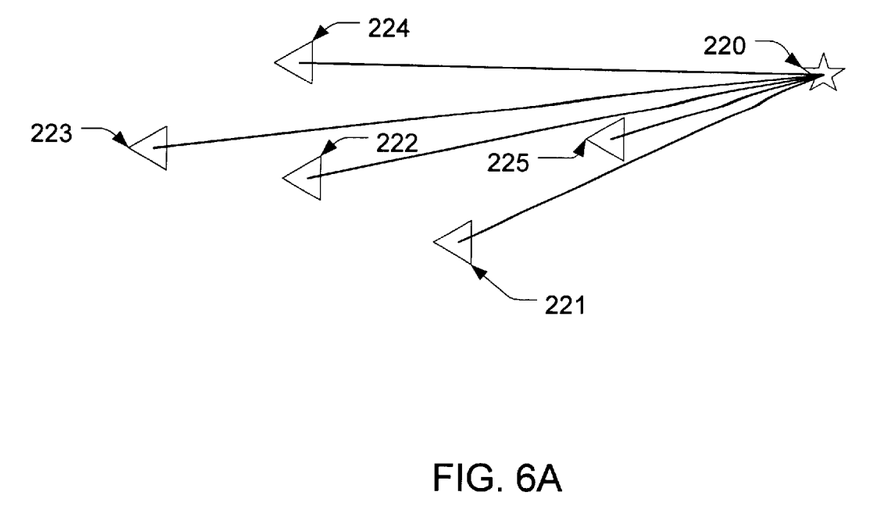
FIG. 6A is a schematic illustration of an exemplary LMU/BTS configuration that has poor HDOP characteristics.
Figure 6B:
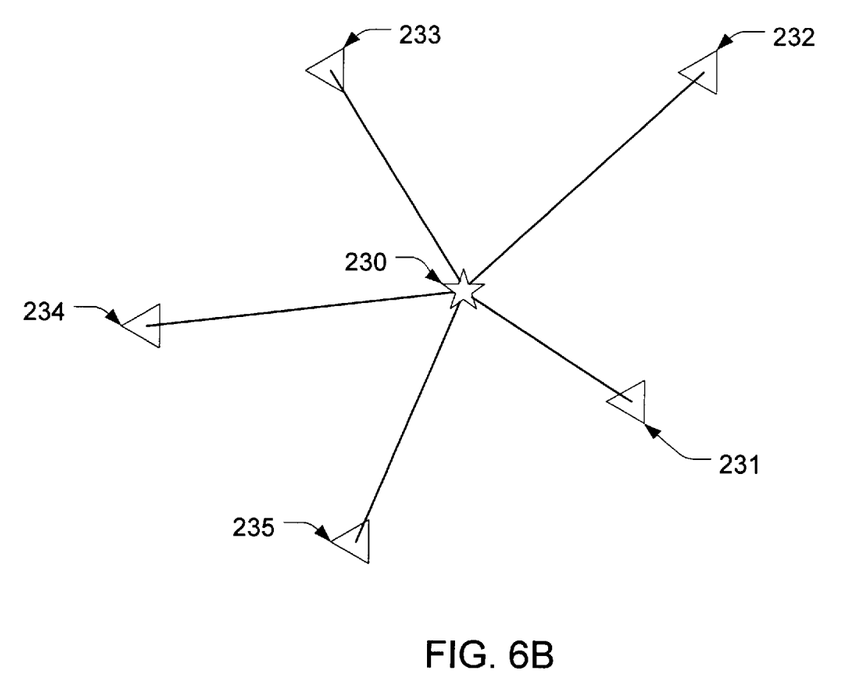
FIG. 6B is a schematic illustration of an exemplary LMU/BTS configuration that has good HDOP characteristics.

A fourth approach to improving the accuracy of the location estimation algorithm is implemented in step S84. In step S84, the horizontal dilution of precision (HDOP) for each preliminary location estimate is determined, based on the geometry of the LMUs used to obtain each of the TOA measurements that contributed to each estimate. An example of an arrangement with poor HDOP is illustrated in FIG. 6A, where all of the LMUs 221–225 lie within a small angular span with respect to the mobile device 220. In this situation, moving the mobile device 220 along the vertical axis will have a relatively small effect on the TOAs measured at the LMUs 221–225, so a small TOA error can result in a large position error. In contrast, the HDOP would be good in the arrangement illustrated in FIG. 6B, where the LMUs 231–235 surround the mobile device 240, and movement of the mobile device 230 in any direction will have a larger effect on at least some of the TOAs measured by the LMUs 231–235. The preliminary location estimate that has the best HDOP (i.e., the minimum HDOP) is selected, and reported as the final location estimate.

In an alternative embodiment, instead of selecting the one preliminary location estimate with the best HDOP, all preliminary location estimates with poor HDOP are discarded, as are all preliminary location estimates that are inconsistent with the majority of the remaining preliminary location estimates. For example, in FIG. 4, since the location estimate 39 is located far away from the remaining location estimates E1, E2, E4, E7, E9, and E11, that estimate 39 would be discarded. Inconsistency of a preliminary location estimate may be determined using any suitable technique including, for example, finding the smallest region 37 into which a significant majority (e.g., $\geq 75\%$) of the location estimates fit, and excluding all location estimates that lie outside of that region. Finally, after discarding the preliminary location estimates based on HDOP and inconsistency, the remaining location estimates are merged by, for example, computing the mean or median X and Y locations. Optionally, the preliminary location estimate used to compute the mean may be weighted based on an expected quality for each preliminary location estimate or based on the qualities of the TOAs used to form each preliminary location estimate. Other alternative approaches for generating a final location estimate based on a subset of the preliminary location estimates may also be implemented.

By using the above-described techniques of modifying the TOA quality indicator, smart subsetting, and using cell information, TA, and HDOP, the accuracy of the final location-estimate can be improved dramatically, even in the presence of multipath. The resulting location estimates can provide the high accuracy associated with systems that use many TOA measurements combined with a high degree of immunity to errors caused by outliers. This improved performance occurs even when the outlier is not the TOA measurement with the worst-quality ranking (i.e., the sixth and seventh-ranked TOA measurements can be used to increase the accuracy of the final location estimate, even when the fifth-ranked TOA measurement is an outlier).

Figure 7:
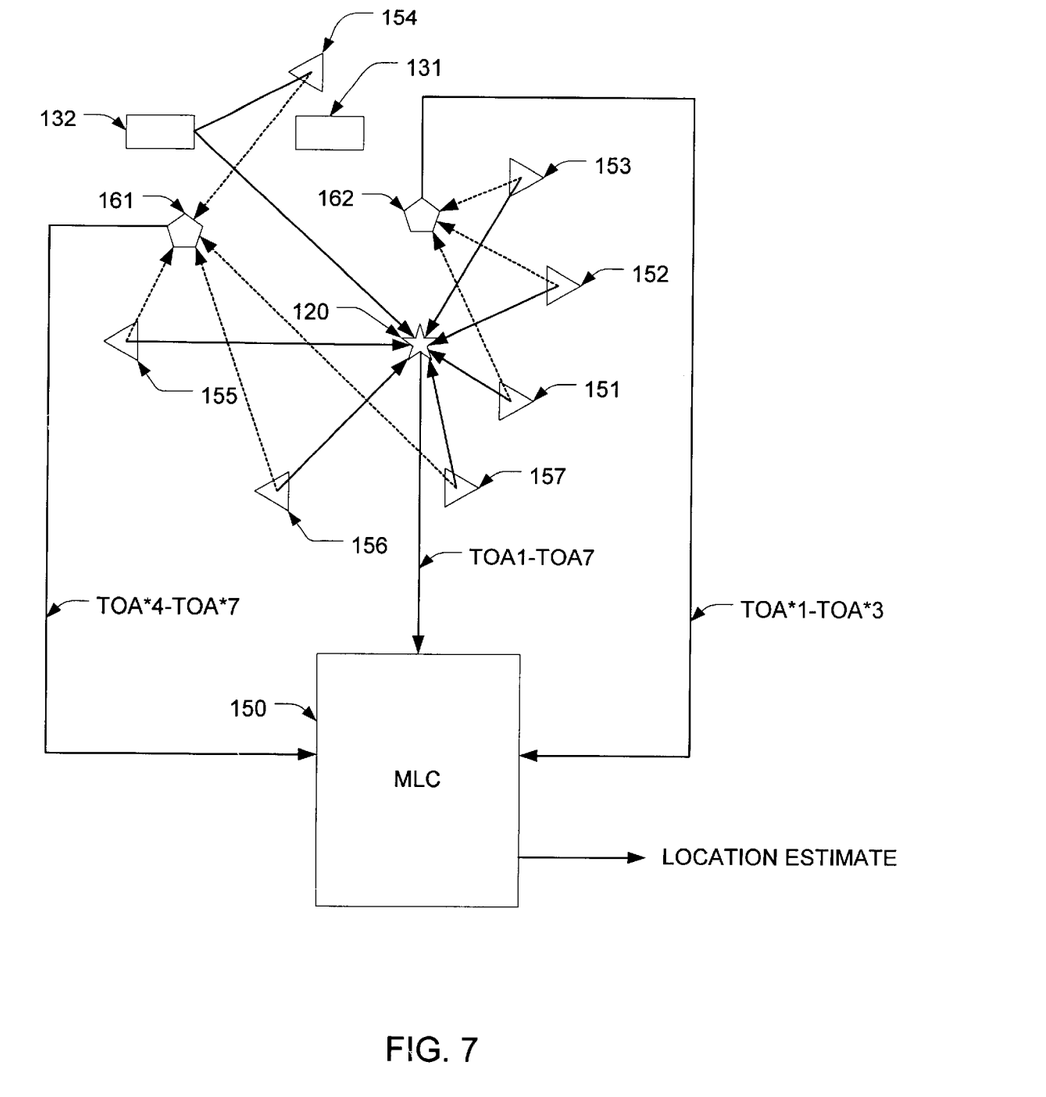
FIG. 7 is a schematic illustration of a hardware configuration for a downlink system, which provides another context for implementing a preferred location algorithm.

While the above-described algorithms are explained in the context of an uplink system, they may also be used in downlink systems, as will be apparent to skilled in the art. In downlink systems, the fixed stations are preferably base stations (BTSs) that are located in the general vicinity of the mobile device. FIG. 7 is an example of such a downlink system, where each of a plurality of BTSs 151–157 transmits signals that are received by the mobile device 120. As in the uplink system, while seven BTSs are illustrated, any number greater than four may be used. The mobile device 120 determines the TOA and $\sigma$ of each of the signals arriving from a BTS, and reports the TOA measurements for those signals TOA1–TOA7 to the MLC 150, together with the $\sigma$s for the TOA measurements. Auxiliary receivers 161, 162 also receive the signals from the BTSs 151–157, and the time of arrival measurements of the signals at the receivers 161, 162 is also determined. These times of arrival TOA*1–TOA*7 are also transmitted to the MLC 150. The MLC 150 uses TOA*1–TOA*7 and the known locations of each of the BTSs 151–157 to compensate for any lack of synchronization of transmission frames of the BTSs 151–157. The MLC 150 then determines a location estimate for the mobile device 120 based on the TOA measurements TOA1–TOA7 received from the mobile device 120, preferably using the algorithms described above.

For downlink systems, an additional suitable criterion for determining the quality of a TOA is the base station selection algorithm (i.e., the same algorithm that ranks the connections to the nearby base stations to determine which base station will communicate with the mobile device). The base station that is currently assigned to communicate with the mobile device will receive the highest quality rating, and BTSs with lower quality communication links will receive lower quality ratings. When an LMU is located next to each BTS, this criterion may be used for uplink systems as well.

While the preferred embodiments described above have been described in the context of location services for wireless networks (e.g., cellular telephones), the present invention may also be used to implement location services in other environments. For example, the algorithms described above may be used in a sonar system to locate an underwater device. Moreover, while the present invention has been explained in the context of the preferred embodiments described above, it is to be understood that various changes may be made to those embodiments, and various equivalents may be substituted, without departing from the spirit or scope of the invention, as will be apparent to persons skilled in the relevant art.

We claim:

1. A method of locating a mobile device comprising:
   obtaining a plurality of time-of-arrival measurements for communications between the mobile device and each of at least six fixed stations;
   distributing the plurality of time-of-arrival measurements into a low-quality set of time-of-arrival measurements and a high-quality set of time-of-arrival measurements based on a first criterion;
   forming a plurality of subsets from the time-of-arrival measurements in the low-quality set;
   obtaining a plurality of preliminary location estimates of the mobile device's location by computing, for each of the plurality of subsets formed from the low-quality set, a preliminary location estimate of the mobile device's location based on all time-of-arrival measurements contained in the respective subset, all time-of-arrival measurements contained in the high-quality set, and the locations of the fixed stations; and
   merging the plurality of preliminary location estimates into a final estimate of the mobile device's location.

2. The method of claim 1, wherein, the communications are transmissions from the mobile device to the at least six fixed stations.

3. The method of claim 1, wherein, the communications are transmissions from the at least six fixed stations to the mobile device.

4. The method of claim 1, wherein merging the plurality of preliminary location estimates comprises selecting a single preliminary location estimate from the plurality of preliminary location estimates.

5. The method of claim 1, wherein merging the plurality of preliminary location estimates comprises selecting a preliminary location estimate having a best horizontal dilution of precision from the plurality of preliminary location estimates.

6. The method of claim 1, wherein merging the plurality of preliminary location estimates comprises discarding all preliminary locations estimates that are inconsistent with current cell information or timing advance information.

7. The method of claim 1, wherein merging the plurality of preliminary location estimates comprises:
   discarding all preliminary locations estimates that are inconsistent with current cell information or timing advance information, resulting in a remaining set of preliminary locations estimates; and
   selecting a preliminary location estimate having a minimum horizontal dilution of precision from the remaining set of preliminary location estimates.

8. The method of claim 1, wherein:
   obtaining a plurality of time-of-arrival measurements comprises obtaining a time-of-arrival measurement for each of seven fixed stations;
   the high-quality set consists of four of the time-of-arrival measurements and the low-quality set consists of three of the time-of-arrival measurements, and
   the plurality of subsets comprises all combinations of the three time-of-arrival measurements in the low-quality set, taken one at a time and taken two at a time.

9. The method of claim 8, wherein the plurality of subsets further comprises a null set containing none of the time-of-arrival measurements contained in the low-quality set and a set of all three time-of-arrival measurements contained in the low-quality set.

10. The method of claim 1, wherein the first criterion is based on an estimated worst-case path loss.

11. The method of claim 1, wherein the first criterion is based on a time-of-ariival quality indicator.

12. The method of claim 1, wherein the first criterion is based on a time-of-arrival quality indicator, a signal-to-noise ratio, and a mean number of selected bursts.

13. A method of locating a mobile device comprising:
   obtaining a plurality of time-of-arrival measurements for communications between the mobile device and each of at least six fixed stations;
   distributing the plurality of time-of-arrival measurements into a first low-quality set of time-of-arrival measurements and a corresponding first high-quality set of time-of-arrival measurements based on a first criterion;
   distributing the plurality of time-of-arrival measurements into a second low-quality set of time-of-arrival measurements and a corresponding second high-quality set of time-of-arrival measurements based on a second criterion;
   forming a first plurality of subsets from the time-of-arrival measurements in the first low-quality set, and a second plurality of subsets from the time-of-arrival measurements in the second low-quality set;
   obtaining a plurality of preliminary location estimates of the mobile device's location by computing, for each of the subsets in the first plurality of subsets and the second plurality of subsets, a preliminary location estimate of the mobile device's location based on all time-of-arrival measurements contained in the respective subset, all time-of-arrival measurements contained in the corresponding high-quality set, and the locations of the fixed stations; and
   merging the plurality of preliminary location estimates into a final estimate of the mobile device's location.

14. The method of claim 13, wherein, the communications are transmissions from the mobile device to the at least six fixed stations.

15. The method of claim 13, wherein, the communications are transmissions from the at least six fixed stations to the mobile device.

16. The method of claim 13, wherein, merging the plurality of preliminary location estimates comprises selecting a single preliminary location estimate from the plurality of preliminary location estimates.

17. The method of claim 13, wherein merging the plurality of preliminary location estimates comprises selecting a preliminary location estimate having a best horizontal dilution of precision from the plurality of preliminary location estimates.

18. The method of claim 13, wherein merging the plurality of preliminary location estimates comprises discarding all preliminary locations estimates that are inconsistent with current cell information or timing advance information.

19. The method of claim 13, wherein merging the plurality of preliminary location estimates comprises:
discarding all preliminary locations estimates that are inconsistent with current cell information or timing advance information, resulting in a remaining set of preliminary locations estimates; and
selecting a preliminary location estimate having a minimum horizontal dilution of precision from the remaining set of preliminary location estimates.

20. The method of claim 13, wherein:
seven time-of-arrival measurements are obtained,
the first high-quality set consists of four of the time-of-arrival measurements, and the first low-quality set consists of three of the time-of-arrival measurements, the first plurality of subsets formed in the forming act comprising all combinations of the three time-of-arrival measurements in the first low-quality set, taken one at a time and taken two at a time, and
the second high-quality set consists of four of the time-of-arrival measurements, and the second low-quality set consists of three of the time-of-arrival measurements, the second plurality of subsets formed in the forming act comprising all combinations of the three time-of-arrival measurements in the second low-quality set, taken one at a time and taken two at a time.

21. The method of claim 20, wherein:
the first plurality of subsets further comprises a null set containing none of the time-of-arrival measurements contained in the low-quality set and a set of all three time-of-arrival measurements contained in the first low-quality set, and
the second plurality of subsets formed in the forming act further comprises a null set containing none of the time-of-arrival measurements contained in the low-quality set and a set of all three time-of-arrival measurements contained in the second low-quality set.

22. The method of claim 13, wherein the first criterion is based on an estimated worst-case path loss, and the second criterion is based on a time-of-arrival quality indicator.

23. The method of claim 13, wherein the first criterion is based on a time-of-arrival quality indicator, and the second criterion is based on the time-of-arrival quality indicator, a signal-to-noise ratio, and a mean number of selected bursts.

24. A method of determining a quality indicator for time-of-arrival measurements for use in a location algorithm, comprising:
obtaining a first quality indicator associated with a time-of-arrival measurement; and
computing a second quality indicator based on the first quality indicator, a signal-to-noise ratio associated with the time-of-arrival measurement, and a mean number of selected bursts (nsb).

25. The method of claim 24, wherein, the second quality indicator is set to $ab\sigma+c$ if SNR<TH, and nsb>N, and the new quality indicator is set to $a*\sigma$ otherwise, where $\sigma$ is a conventional time-of-arrival quality indicator, b and c are constants, and a is a function of SNR (signal-to-noise ratio).

26. The method of claim 25, wherein b=2, c=1, and a depends on SNR as follows:

| SNR > 15 dB | a = 0.8 |
| 15 dB > SNR ≥ 10 dB | a = 0.9 |
| 10 dB > SNR ≥ 5 dB | a = 1.0 |
| 5 dB > SNR ≥ 0 dB | a = 1.2 |
| 0 dB > SNR ≥ −5 dB | a = 1.4 |
| −5 dB > SNR | a = 1.5. |

27. The method of claim 24, wherein, the second quality indicator is formulated so that a correlation between the second quality indicator and a true time-of-arrival error is higher than a correlation between the first quality indicator and the true time-of-arrival error.

28. A computer-readable media upon which instructions for determining a quality indicator for time-of-arrival measurements for use in a location algorithm are stored, wherein execution of the instructions causes a computer to perform the acts of:
obtaining a first quality indicator associated with a time-of-arrival measurement; and
computing a second quality indicator based on the first quality indicator, a signal-to-noise ratio associated with the time-of-arrival measurement, and a mean number of selected bursts (nsb).

29. The computer-readable media of claim 28, wherein, the second quality indicator is set to $ab\sigma+c$ if SNR<TH, and nsb>N, and the second quality indicator is set to $a*\sigma$ otherwise, where $\sigma$ is a conventional time-of-arrival quality indicator, b and c are constants, and a is a function of SNR (signal-to-noise ratio).

30. The method of claim 29, wherein b=2, c=1, and a depends on SNR as follows:

| SNR > 15 dB | a = 0.8 |
| 15 dB > SNR ≥ 10 dB | a = 0.9 |
| 10 dB > SNR ≥ 5 dB | a = 1.0 |
| 5 dB > SNR ≥ 0 dB | a = 1.2 |
| 0 dB > SNR ≥ −5 dB | a = 1.4 |
| −5 dB > SNR | a = 1.5. |

* * * * *

UNITED STATES PATENT AND TRADEMARK OFFICE
CERTIFICATE OF CORRECTION

PATENT NO. : 6,756,940 B2
DATED : June 29, 2004
INVENTOR(S) : Oh et al.

It is certified that error appears in the above-identified patent and that said Letters Patent is hereby corrected as shown below:

Column 3,
Line 63, delete "$\sigma$" and insert -- $\sigma'$ --.

Column 4,
Lines 33 and 67, delete "$\sigma$" and insert -- $\sigma'$ --.

Column 10,
Line 24, delete "time-of-ariival" and insert -- time-of-arrival --.

Column 11,
Line 54, delete "use-in" and insert -- use in --.

Signed and Sealed this

Thirty-first Day of August, 2004

JON W. DUDAS
*Director of the United States Patent and Trademark Office*